Figure 1:
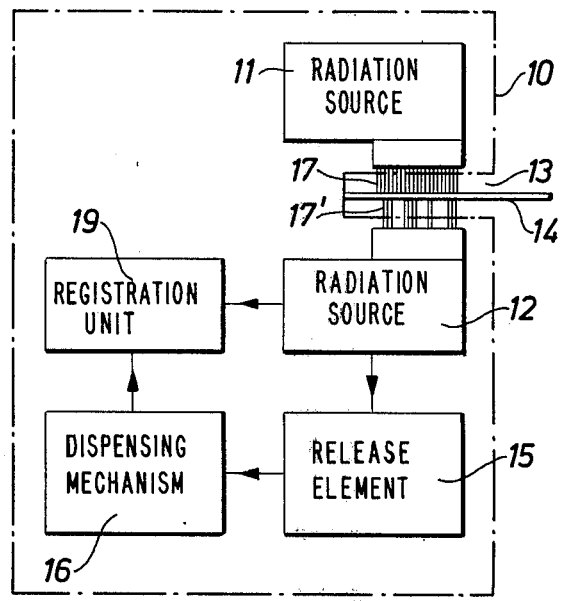

United States Patent
Rausing

[11] 3,936,662
[45] Feb. 3, 1976

[54] INTERLOCKING SYSTEM WITH A NUMBER OF INDIVIDUAL KEY ELEMENTS

[76] Inventor: Anders Ruben Rausing, Via Kenia 22-24, Rome, Italy, I

[22] Filed: Jan. 14, 1974

[21] Appl. No.: 433,373

[52] U.S. Cl. .................. 235/61.12 N; 235/61.11 E
[51] Int. Cl. ....................... G06k 19/06; G06k 7/10
[58] Field of Search... 235/61.11 E, 61.7 B, 61.12 N; 340/149 A, 146.3 K; 117/239, 25, 29

[56] References Cited
UNITED STATES PATENTS

| | | | |
|---|---|---|---|
| 2,919,851 | 1/1960 | Otis | 235/61.9 R |
| 2,970,877 | 2/1961 | Parsons et al. | 235/61.7 B |
| 3,657,521 | 4/1972 | Constable | 235/61.7 B |
| 3,691,527 | 9/1972 | Yamamoto | 340/149 A |
| 3,761,682 | 9/1973 | Barnes et al. | 340/149 A |

*Primary Examiner*—Daryl W. Cook
*Attorney, Agent, or Firm*—Pierce, Scheffler & Parker

[57] ABSTRACT

An interlocking system includes a number of individual key elements such as an identity card each of which has a pre-determined code marking consisting of a number of index elements arranged to form a pattern. At least one interlocking device adapted to co-operate with the key elements includes a release element sensitive to radiation as a function of the radiation pattern pre-determined by the code marking on the key element. The interlocking device comprises a radio-active radiation source, a detector and means such as a slot for interposing the coded key element between the radiation source and the detector.

1 Claim, 2 Drawing Figures

INTERLOCKING SYSTEM WITH A NUMBER OF INDIVIDUAL KEY ELEMENTS

The present invention relates to an interlocking system with a number of individual key elements, each of which has a pre-determined code marking consisting of a number of index elements, and at least one interlocking device adapted for co-operation with anyone of the key elements with a radiation-sensitive release element for the release of the interlocking device as a function of a radiation pattern pre-determined by the key element with the said code marking.

It has been suggested to arrange the radiation source in such an interlocking system as a radio-active radiation source on the key element itself, which is designed as, and has the character of, a usual identity card for credit purchases (credit card), so that the forgery of such a key element would be made appreciably more difficult and become practically impossible, inasmuch as access to radio-active radiation sources cannot readily be obtained. When such a key element is introduced into the interlocking device, it gives off radiation of a certain character and with a certain radiation pattern to the radiation-sensitive release element, which on picking up this radiation, if it corresponds to the predetermined radiation pattern induces the release of the interlocking device, for example for the proportioning out of an article in pre-determined quantities or for the issue of a pre-determined sum of money. At the same time, by means of markings on the key element, the necessary customer-recording and quantity-recording can be carried out, as is customary in conjunction with certain credit cards.

The objection has been raised against this type of interlocking system, that no control is exercised over the radiation sources incorporated in the key elements issued, but that these may intentionally or unintentionally find some different use than the intended one with consequent risks of injury. Already the fact that the radiation-emitting key element is carried about in the wallet or pocket, is considered by many to be unsatisfactory, even if it is only a matter of relatively weak and relatively harmless radiation sources, since it is hardly possible to foresee what effects such a radiation, even if weak, may have in the long run.

With the object of removing such dangers it is proposed in accordance with the invention to produce an interlocking system of the type, in which the radiation source is under safe control in the interlocking device, whilst the key element is still of such a character that an imitation of the same is difficult to achieve.

Figure 2:
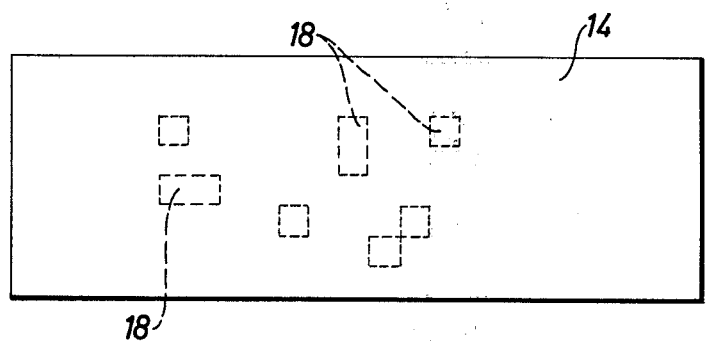

To explain the invention in more detail it will be described in the following with reference to the enclosed drawing, wherein FIG. 1 shows schematically and in the form of a block diagram an interlocking system in accordance with the invention, and FIG. 2 shows in plan view a key element that can be inserted into this interlocking system.

The interlocking system according to FIG. 1 comprises an interlocking device which is marked by a dash-dotted line 10 and comprises a radiation source 11 and a radiation detector 12 situated straight opposite the same, a slot 13 being provided between the radiation source and the radiation detector for the introduction of a key element 14 between radiation source and radiation detector. To the radiation detector 12 is connected a release element 15 for actuation of a delivering or dispensing mechanism 16.

The radiation source 11 emits radio-active radiation of a suitable type, preferably gamma radiation, in a bundle of rays 17 which is directed towards the radiation detector 12. The key element 14, as is shown in greater detail in FIG. 2, is realized as an identity card or part of an identity card, with a pre-determined code mark consisting of a number of index elements 18. These index elements consist of non-perforated portions which are largely transparent in respect of the radiation bundle 17, whilst the remainder of the key element is largely opaque in respect of this radiation. The key element may consist of a supporting sheet, for example of plastic material, which in the opaque portion of the key element if coated with a chemical compound incorporating a heavy metal, for example a salt or an oxide of lead or mercury. In the delimited portions which form the index elements 18, this coating is substituted by another coating which is substantially transparent in respect of the radiation 17, but is in appearance similar to the opaque coating, so that the coating of the key element, by appearance, is of homogeneous character. This makes difficult any imitation of the key element with the guidance of an existing key element. The key element may be moulded in its entirety in plastic and thus consist of a laminate, and on the card may be printed, or applied in some other manner, the data which are usual on an identity card. In FIG. 2 are shown only a few index markings of a considerable size, but it is obvious that these index markings may be of a smaller size and may be of a much greater number.

When the key element 14 is introduced into the interlocking device the radiation 17 will be partly shut out from the radiation detector 12 by the key element 14, so that a radiation bundle 17 with a radiation pattern determined by the index markings 18 will arrive at the radiation detector 12. If the radiation pattern is of a certain pre-determined character, the radiation detector will then act upon the release device 15, so that the latter in turn acts upon the delivering or issuing mechanism 16 for delivering out of a pre-determined quantity of an article or the issue of an article or a sum of money. If the radiation pattern is not the predetermined one, no effect will be exerted by the release device 15. The functional connection between radiation detector 12 and release element 15 can be brought about by known electronic means and need not therefore be described in detail, especially as these means can be of the same kind as in the interlocking system where the radiation source is arranged in the key element itself.

To the radiation detector 12 may also be connected, as shown in FIG. 1, a unit for the necessary identification and registration of the owner of the key element with the guidance of the index markings on the key element and possibly also the quantity of goods or sum of money drawn, if this is not the same each time a key element is inserted in the interlocking system. For such quantity registration the unit 19 may also be dependent on the proportioning or issuing mechanism 16.

Since the essential aspect of the key element 14 in accordance with the invention consists in that the key element has a different permeability in respect of the radiation used in the portions 18 forming the index element than the remainder of the key element, it is of course also conceivable to make the index elements opaque and the remainder of the key element transparent in respect of the radiation used. The key element can be realized as an identity card, which is withdrawn again from the interlocking device when the desired delivery or issue has been completed, but it may also have the character of a card for single usage, which is stored in the interlocking device, in which case there is no need for a registration unit 19, since the necessary customers' registration takes place by means of the key elements accumulated in the interlocking device.

I claim:

1. In an interlocking system actuatable by any one of a plurality of differently coded key elements, said system comprising an interlocking device including a radio-active source of radiation, a radiation code detector having its input side located in spaced relation to said radiation source, a release element connected to the output side of said code detector and means for receiving the coded key elements between said radiation source and said code detector, the improvement wherein each said coded key element comprises a sheet of plastic material, the portions of said sheet opaque to the radiation being established by a coating of a chemical compound incorporating a heavy metal and the portions of said sheet transparent to the radiation and representing the code pattern being established by a different coating but which has a visual appearance similar to that of the opaque coating so that the sheet of plastic material appears homogeneous throughout its surface and thereby in effect makes the code pattern invisible.

* * * * *